United States Patent [19]

Campbell et al.

[11] Patent Number: 4,501,860

[45] Date of Patent: Feb. 26, 1985

[54] REAGENTS FOR GRAFT COPOLYMERS

[75] Inventors: David S. Campbell; Andrew J. Tinker; Peter G. Mente, all of Hertfordshire, England

[73] Assignee: The Malaysian Rubber Producers' Research Association, England

[21] Appl. No.: 374,866

[22] Filed: May 4, 1982

[30] Foreign Application Priority Data

May 7, 1981 [GB] United Kingdom ............... 8113986

[51] Int. Cl.³ .................. C08K 5/23; C08L 25/04; C08L 33/08; C08L 83/04

[52] U.S. Cl. .................. 525/359.4; 525/194; 525/329.9; 525/330.5; 525/333.6; 525/376; 525/408; 525/415; 525/474

[58] Field of Search ............... 525/376, 187, 190, 194, 525/329.9, 330.1, 330 B, 333.6, 374, 359, 408, 474, 330.5

[56] References Cited

U.S. PATENT DOCUMENTS 4,221,681 9/1980 Campbell et al. .................... 525/376
4,255,536 3/1981 Udipi ................................. 525/376

Primary Examiner—Allan M. Lieberman
Attorney, Agent, or Firm—Wenderoth, Lind & Ponack

[57] ABSTRACT

A hydroxyl-functional polymer is reacted with a compound $ZCO.N(H)_x.N(H)_x.CO.OR$, where Z is halogen or aryloxy, x is 0 or 1 and R is hydrocarbon, and the reaction product is if necessary oxidized to give an azodicarboxylate functional polymer having the formula $QOCO.N:N.CO.OR$ where Q is an inert polymer group. This polymer is used to react with ethylenically unsaturated natural or synthetic rubber so as to graft groups derived from the polymer on the rubber backbone.

8 Claims, No Drawings

REAGENTS FOR GRAFT COPOLYMERS

This invention relates to a method of preparing certain azodicarboxylate-functional polymers and to their use in the preparation of graft copolymers.

European Patent Specification No. 0000976 (Application No. 78300155.5) describes a method of forming graft copolymers by attaching pre-polymerised side chains to a natural or synthetic rubber backbone. The application is particularly directed to a method in which pre-polymerised side chains are reacted with unsaturated rubber backbones via a terminal azodicarboxylate function. Specifically this reaction is carried out by direct mixing of the side-chain polymer and the unsaturated rubber backbone.

Similar graft copolymer products can be obtained by reacting the side-chain polymer and the unsaturated rubber in a mutual solvent under suitable conditions of time and temperature.

In this prior Specification, the synthesis of the azodicarboxylate-functional polymer was not critical. The technique described involves reacting the hydroxyl-functional polymer, QOH, where Q is a polymeric chain, with excess phosgene to give the polymeroxycarbonyl chloride, reacting this with ethyl carbazate to give the ethyl 2-polymeroxycarbonylhydrazine carboxylate and oxidizing this to give the azodicarboxylate-functional polymer.

With careful manipulation this synthetic sequence is capable of giving high azodicarboxylate functionality when Q is poly(styrene), but the procedure is cumbersome and not well suited to large-scale operation. Each successive step is performed on the polymer molecule and intermediate isolation of the polymer is necessary to avoid accumulation of reaction by-products.

The present invention provides a method of preparing an azodicarboxylate-functional polymer by mixing an hydroxyl-functional polymer with a compound having the formula:

$$Z.CO.N(H)_x.N(H)_x.CO.OR \qquad I$$

where Z.CO is a carboxylic acid derivative reactive towards hydroxyl groups; x is 0 or 1; and R is a $C_1$ to $C_{12}$ primary or secondary straight- or branched-chain alkyl, cycloalkyl, aryl, alkaryl or aralkyl group; in an anhydrous organic reaction medium which is a solvent for the reactants; maintaining the mixture under conditions to effect reaction between the polymer and the compound; when x=1, oxidizing the hydrazo group of the product to an azo group; and recovering the resulting azodicarboxylate-functional polymer.

The hydroxyl-functional polymer may be represented as having the formula QOM, where Q is an inert polymeric group and M is either hydrogen or a negative charge, associated with a positive metal counter-ion, typically lithium or aluminium, such that the polymer shows hydroxyl functionality. The chemical reaction may be shown as $$QOM + ZCO.N(H)_x.N(H)_x.CO.OR \rightarrow$$
$$QOCO.N(H)_x.N(H)_x.CO.OR + MZ$$

Azodicarboxylate-functional polymers prepared by this method can be used to form graft copolymers with unsaturated rubber backbones by reaction in solution (D. S. Campbell, D. E. Loeber and A. J. Tinker, Polymer 19, 1978, p.1106) or, in certain cases, by the procedure set out in European Patent Specification No. 0000976.

The compound of the formula I, where Z=Cl, x=1 and R=ethyl, i.e. 2-ethoxycarbonylhydrazinecarbonyl chloride, is a known compound and is described in J.Am.Chem.Soc,89, 1967, p. 1417 et seq. This compound is known to react with ethanol to give diethyl hydrazine-1, 2-dicarboxylate and with p-bromoaniline to give the corresponding N-p-bromophenyl amide. The compound of the formula 1, where Z=Cl x=1 and R=benzyl is a known compound and is described by J. Gante in Chem. Ber. 97, 1964, p 2551. These compounds apart, the compounds of the formula I are believed to be novel.

The reactive group ZCO is preferably a carbonyl halide group especially a carbonyl chloride group because such groups react readily with hydroxyl groups; or an aryl ester group i.e. where Z is aryloxy, which are somewhat less reactive than the carbonyl halides but are more stable.

We have not isolated compounds of the formula I, where Z=halogen and x=0, as pure materials, but solutions which behave as if they contain such compounds as the major reactive constituents are obtained by oxidation of compounds of the formula I where Z=halogen and x=1. We have sometimes observed that the infra-red spectra of the oxidised solutions are consistent with them containing compounds of the formula I, where Z=halogen and x=0, as being the major constituents but throughout this specification it is to be understood that the reactive solution may contain other related compounds such as N-halogenated derivatives or isomeric species. Compounds of the formula I, where Z is an aryloxy group and x=0 have been isolated and characterized.

The synthetic route to 2-ethoxycarbonylhydrazinecarbonyl chloride in the J.Am.Chem. Soc. article, involves the reaction of ethyl carbazate with a five-fold molar excess of phosgene in diethyl ether. We have developed an improved synthesis of compounds of the formula I, where Z=Cl and x=1 by reacting the carbazate corresponding to the substituent R with phosgene in only 50% molar excess and have obtained yields of 90% and higher. The appropriate carbazate starting materials are either known compounds or can be made by conventional synthesis.

Compounds of the formula I, where x=1, react with hydroxyl-functional polymers in a mutual solvent to give the hydrazine-1,2-dicarboxylate function on the polymer chain (Q,M,Z and R being as defined above):

$$QOM + Z.CO.NH.NH.CO.OR \rightarrow QO.CO.NH.NH.CO.OR + MZ.$$

Preferably, the reaction is effected in 1 to 14 days at a temperature of 0° C. to 40° C., using from 1 to 5 molar equivalents of the compound of formula I per mole of hydroxyl-functional polymer. The reaction is conveniently performed at ambient or near-ambient temperature. Catalysts may be used to speed up reaction. Pyridine and quinoline offer useful catalytic activity without serious competition from decomposition reactions. Compounds where R is higher alkyl or cycloalkyl offer some advantage in the reaction because of their higher solubility in organic solvents compared with the corresponding methyl or ethyl compounds.

A special case of the reaction of compounds of the formula I, where Z=Cl and x=1, with hydroxyl functionality in polymers arises when the functionality is in the form of an aluminium alkoxide. Rapid and efficient reaction then occurs to give hydrazine-1,2-dicarboxylate functionality on the polymer. This situation arises, for example, when the polymer is poly(ε-caprolactone) obtained by living polymerization of ε-caprolactone in the presence of aluminium iso-propoxide (Y. Ouhadi, C. Stevens and P. H. Teyssie, Makromol. Chem. Suppl. I, 1975, p.191).

The polymers with hydrazine-1,2-dicarboxylate functionality are stable materials which have been isolated and characterized. In the present invention they are intermediates which are subsequently oxidised to the corresponding polymers with azodicarboxylate functionality. This can be accomplished by generally known procedures for example Polymer 19, 1978, p. 1106 et seq. The oxidized polymers can be used for the formation of graft copolymers by reaction with polymers having ethylenic unsaturation. This route to polymers with azodicarboxylate funtionality offers a significant advance over the published synthetic sequence in terms of ease of manipulation. It avoids the necessity of treating polymers with phosgene and reduces the number of reaction steps involving the polymer. In the special case of polymers which can be obtained with the hydroxyl functionality in the aluminium alkoxide form, this is the preferred route to azodicarboxylate functionality because an inexpensive water-based oxidation system (hypochlorous acid generated from sodium hypochlorite and acid) can be used for the final conversion of hydrazine-1,2-dicarboxyate functionality to azodicarboxylate functionality.

Oxidation of compounds of the formula I, where $Z$=halogen and $x$=1, to the corresponding compound where $x$=o must use oxidants which do not contain water and which do not generate water in the course of the oxidation because of the reactivity of the group Z.CO—, where $Z$=halogen. Thus, hypochlorous acid (generated in situ from sodium hypochlorite and acid) is not a suitable oxidant for this reaction. Oxidants which can be used for this oxidation reaction include chlorine; chlorine or bromine in the presence of pyridine; t-butyl hypochlorite; N-bromosuccinimide; and N-chlorobenzotriazole. Oxidation with t-butyl hypochlorite results in the formation of t-butyl alcohol which potentially could react with azo acid chloride to give the corresponding t-butyl azodicarboxylate. In competion with primary or secondary hydroxyl groups on polymer chains this reaction is not a serious complication provided the azo acid chloride solution is used for reaction with polymer immediately after its preparation. The same range of oxidants is effective where Z is other than halogen e.g. aryloxy.

Solutions of compounds of the formula I, where $x$=o, react with a variety of polymers having hydroxyl functionality to give the corresponding polymers with azodicarboxylate functionality thus (Q,M,Z and R being as defined above):

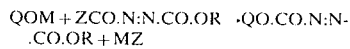

QOM+ZCO.N:N.CO.OR → QO.CO.N:N.CO.OR+MZ

Preferably, the reaction is effected in from 1 hour to 30 days at a temperature of from 0° C. to 40° C. using from 1 to 5 molar equivalents of the compound of formula I per mole of hydroxyl-functional polymer. The resulting polymers react with ethylenically unsaturated polymers to give graft copolymers. The reactivity of compounds of the formula I, where $Z$=halogen and $x$=o, towards hydroxyl groups is very much higher than the corresponding substituted hydrazines. It is not necessary to use catalysts to promote the reaction. Compounds of the formula I, where $Z$=aryloxy and $x$=o, are less reactive and when these compounds are used, the inclusion of a catalyst is beneficial. Suitable catalysts include protic acids (as for ester exchange reactions generally) and, preferably, imidazole or triphenylphosphine.

When the polymer hydroxyl functionality is in the alkoxide form e.g. the primary product of reaction of poly(styryl)lithium with ethylene oxide, side reactions occur which result in coupling of a substantial proportion of the polymer molecules to give dimeric species. The azodicarboxylate functionality of the resulting polymer is low. This side reaction is, to a large extent, suppressed if acidic or potentially acidic materials are present in the oxidized reagent solution, e.g. hydrogen chloride when t-butyl hypochlorite is used as oxidant, or pyridinium salts when bromine in the presence of pyridine is used as oxidant.

Oxidation of compounds of the formula I, where $x$=1 can, in some circumstances, be carried out in the presence of the hydroxyl-functional polymer. Reaction to form the azodicarboxylate-functional polymer then occurs in situ We have successfully used several different hydroxyl-functional polymers to produce graft polymers. In testing for efficacy we have, in general, assessed the resulting azodicarboxylate-functional polymers by their ability to graft to anionically polymerised poly(isoprene) (e.g. Cariflex IR 305 polyisoprene) in solution or by drymixing.

The grafting reactions can also be applied to other highly unsaturated polymers, including Natural Rubber, under the conditions described in European Patent Specification No. 0000976 by reaction in the solid phase, or by reaction in solution.

The azodicarboxylate-functional polymers, and the hydroxyl-functional polymers from which they are derived, may have a number average molecular weight in the range 500–50,000, preferably 3000–15,000. The grafting reaction mixture preferably contains from 40–90% by weight of the rubber and correspondingly from 60–10% by weight of the azodicarboxylate-functional polymer, on the weight of the two reactants. Graft polymer formation is preferably effected at a temperature of from 50° C. to 180° C., the lower temperatures applying to reaction in solution and the higher temperatures applying to reaction by direct mixing, with corresponding reaction times of 10 days to 5 minutes.

In the present Application the formation of graft copolymer is assayed by gel-permeation chromatography. Grafting efficiencies are expressed as the percentage, by weight, of the total graft polymer species which becomes chemically bound to the backbone polymer in the grafting reaction. In a limited number of Examples, spectroscopic analysis has been found adequate to characterize the azodicarboxylate-functional poly(styrene) samples. These samples showed strong carbonyl absorption at 1780 cm$^{-1}$ (ir) and an absorption maximum near 407 nm (uv), in agreement with other samples of azodicarboxylate-functional poly(styrene) which were shown to react with backbone polymers to give graft copolymers.

The method of preparation of the hydroxyl-functional polymers is not critical to this invention. Polymers used in the Examples have been obtained by procedures known in the chemical literature or by simple extension or modification of such procedures. Other synthesis may be apparent to those skilled in the art and the examples used are not limiting. Hydroxyl-functional polymers which have been used to demonstrate the invention are:

1. Poly(styrene) prepared by anionic polymerization initiated with n-butyl lithium or sec-butyl lithium and functionalised by reaction of the polymer carbanion with ethylene oxide.
2. Poly(styrene) prepared by anionic polymerization initiated with 6-lithiohexyl acetaldehyde acetal and hydroxyl-functionalised by subsequent hydrolysis of the acetal function on the polymer.
3. Poly(styrene) prepared by free-radical polymerization of styrene in the presence of 2,2,2,-tribromoethanol as chain transfer agent.
4. Poly($\alpha$-methylstyrene) prepared by anionic polymerization of $\alpha$-methylstyrene and functionalised by reaction of the polymer carbanion with ethylene oxide.
5. Poly(methylmethacrylate), poly(n-butylmethacrylate) and poly(n-hexylmethacrylate) prepared by free-radical polymerization in the presence of 2-mercaptoethanol as chain transfer agent.
6. Poly($\epsilon$-caprolactone) prepared by initiation of $\epsilon$-caprolactone polymerization with aluminium isopropoxide.
7. Poly(dimethylsiloxane) prepared by polymerization of hexamethyl-trisiloxane initiated with 6-lithiohexyl acetaldehyde acetal and hydroxyl functionalised by subsequent hydrolysis of the acetal function on the polymer.
8. Poly(ethylene oxide) obtained as a commercial material.

The following Examples illustrate the invention:

Examples 1 to 7 illustrate the preparation of compounds of the formula I where, Z=Cl and x=1. Example 1 represents an improved procedure for the preparation of the known compound of the formula I, where Z=Cl, x=1, R=Et (2-ethoxycarbonylhydrazinecarbonyl chloride).

EXAMPLE 1

Phosgene (100 ml, 1.41 mole) was condensed into a 2 l flask and anhydrous diethyl ether (160 ml) was added. The solution was kept at 0° C. in an ice bath and ethyl carbazate (103 g, 1 mole) in anhydrous diethyl ether (800 ml) was added dropwise over a period of 3 hr to the stirred phosgene solution. Stirring was continued for 1 hr after the end of the addition and ether and excess phosgene were removed by distillation. The crude solid product was re-dissolved in warm anhydrous ether (800 ml) and filtered in a dry atmosphere to remove insoluble by-products. Evaporation of the filtrate gave 2-ethoxycarbonylhydrazinecarbonyl chloride (150 g, 90%) m.p. 78°–80° C. Recrystallisation of a sample from a mixture of anhydrous diethyl ether and petroleum ether (1:2.5) gave a colourless crystalline solid mp 82°–6° C. (Lit 78°–80° C.). The ir spectrum of the product was in agreement with the published spectrum.

Example 2

Example 1 was repeated but substituting methyl carbazate (50 g, 0.55 mole) for the ethyl carbazate and using phosgene (75 ml, 1.13 mole) in dry ethyl acetate as solvent. Solvent was removed under reduced pressure at a bath temperature <60° C. and the product was re-dissolved in ethyl acetate, filtered to remove insoluble material and recovered by evaporation of the solvent in vacuo, giving 2-methoxycarbonylhydrazinecarbonyl chloride (77 g, 92%) mp 55°–58° C. The ir spectrum was similar to that of 2-ethoxycarbonylhydrazinecarbonyl chloride.

EXAMPLE 3

Example 1 was repeated but substituting iso-butyl carbazate (24.75 g, 0.6 mole) for the ethyl carbazate and using phosgene (20 ml, 0.3 mole) in diethyl ether. 2-(2-methylpropyloxycarbonyl)hydrazinecarbonyl chloride was isolated as a viscous oil (31 g, 84%) whose ir spectrum was similar to that of 2-ethoxycarbonylhydrazinecarbonyl chloride.

Example 4

Example 1 was repeated but substituting n-hexyl carbazate (32.1 g, 0.2 mole) for the ethyl carbazate and using phosgene (50 ml, 0.70 mole) in diethyl ether. 2-(n-hexyloxycarbonyl)hydrazinecarbonyl chloride was isolated as a viscous oil which crystallised slowly at room temperature (40 g, 90%). Its ir spectrum was similar to that of 2-ethoxycarbonylhydrazinecarbonyl chloride with reduced carbonyl and >N-H intensities relative to aliphatic absorptions.

EXAMPLE 5

Example 1 was repeated but substituting dodecyl carbazate (122 g, 0.5 mole) for the ethyl carbazate and using phosgene (50 ml, 0.7 mole) in diethyl ether. 2-Dodecyloxycarbonylhydrazinecarbonyl chloride was isolated as a solid (125 g, 82%) mp 58°–62° C., whose ir spectrum was similar to that of 2-ethoxycarbonylhydrazinecarbonyl chloride with reduced carbonyl and >N-H intensities.

EXAMPLE 6

Example 1 was repeated but substituting phenyl carbazate (77.3, 0.57 mole) for the ethyl carbazate and using phosgene (50 ml, 0.7 mole) in dry dichloromethane. 2-Phenoxycarbonylhydrazinecarbonyl chloride was isolated as impure solid (42 g, 54%) mp 76°–80° C. decomp., whose ir spectrum was consistent with the named compound being the major component.

EXAMPLE 7

Example 1 was repeated but substituting benzyl carbazate (41.5 g, 0.25 mole) for the ethyl carbazate and using phosgene (30 ml, 0.4 mole) in diethyl ether. 2-Benzyloxyhydrazinecarbonyl chloride was isolated as a solid (53 g, 93%) mp 62°–64° C., whose ir spectrum was similar to that of 2-ethoxycarbonylhydrazinecarbonyl chloride.

Examples 8 to 12 illustrate the use of compounds of the Formula I, where x=1, in the preparation of polymers with azodicarboxylate functionality by reaction with hydroxyl-functional polymers and subsequent oxidation.

Example 8

Hydroxyl-functional poly(styrene) (number average molecular weight, $\overline{M}_n$ 5,000; molecular weight distribution, d 1.06; 60 g, 0.012 mole) and 2-ethoxycarbonylhydrazinecarbonyl chloride (2.9 g, 0.0175 mole) were dissolved in dry dichloromethane (300 ml) and allowed to react at room temperature for 14 days. The polymer was recovered by precipitation into methylated spirits and dried in vacuo at 35° C. An ir spectrum of the polymer in dichloromethane solution (10% w/v) showed absorption bands at 3400 cm$^{-1}$ and 1740 cm$^{-1}$ characteristic of the hydrazine-1,2-dicarboxylate functional group (D. S. Campbell, D. E. Loeber and A. J. Tinker, Polymer 19, 1978, p.1106). The dry polymer (29 g, $5.8 \times 10^{-3}$ mole) was dissolved in toluene (145 ml) and t-butyl hypochlorite (0.9 ml, $5.19 \times 10^{-3}$ mole) was added. The solution was stirred in the dark at ambient temperature for 30 min and the polymer was recovered by precipitation into methylated spirits and dried in vacuo at 35° C. The azodicarboxylate-functional polymer, when mixed with Cariflex IR 305 poly(isoprene) under the conditions described in European Patent Specification 0000976, gave a graft copolymer in which 63% of the poly(styrene) was chemically bound to the poly(isoprene) backbone (i.e. a grafting efficiency of 63%).

EXAMPLE 9

Hydroxyl-functional poly(styrene) ($\overline{M}_n$ 7615; d 1.04; 106 g, 0.014 mole) was dissolved in dry toluene (400 ml) and reacted with a solution of 2-ethoxycarbonylhydrazinecarbonyl chloride (7.9 g, 0.048 mole) and pyridine (3.75 ml, 0.047 mole) in dry dichloromethane (500 ml) at ambient temperature for three days. The polymer was recovered by precipitation into methylated spirits and dried in vacuo at 35° C. A sample of the dry polymer (50 g) was dissolved in dry toluene (250 ml) and oxidised by the method described in Example 8. The recovered azodicarboxylate-functional polymer gave a grafting efficiency of 73% when tested under the conditions described in Example 8.

EXAMPLE 10

Example 9 was repeated, but using an equimolar amount of quinoline instead of pyridine. The azodicarboxylate-functional polymer gave a grafting efficiency of 72%.

EXAMPLE 11

This example uses the compound of Formula I, where Z=Cl, x=1, R=cyclohexyl, which is partially soluble in toluene and does not require the use of dichloromethane as a co-solvent. Hydroxyl-functional poly(styrene) ($\overline{M}_n$ 5,000, d 1.06; 20 g, $4 \times 10^{-3}$ mole) in toluene (80 ml) was reacted with 2-cyclohexyloxycarbonylhydrazinecarbonyl chloride (2.3 g, $10.7 \times 10^{-3}$ mole) and quinoline (1.26 ml, $10.7 \times 10^{-3}$ mole) at room temperature for 24 hr. The polymer was recovered and dried as described in Example 8 and oxidised to the azodicarboxylate-functional polymer, which gave a grafting efficiency of 71% with Cariflex IR 305 poly(isoprene) under the conditions described in European Patent Specification No. 0000976.

EXAMPLE 12

This example demonstrates the high efficiency of reaction of 2-ethoxycarbonylhydrazinecarbonyl chloride, with hydroxyl-functional polymer having the hydroxyl function in the aluminium alkoxide form. $\epsilon$-Caprolactone (21.6 g) was polymerised in dry dichloromethane (70 ml) using aluminium isopropoxide ($3.78 \times 10^{-3}$ mole) as initiator. The polymerisation time was 15 min at 0° C. 2-Ethoxycarbonylhydrazinecarbonyl chloride (2.44 g, $1.47 \times 10^{-2}$ mole) was added to the polymer solution under a dry atmosphere and allowed to react at ambient temperature for 72 hr. Sodium hypochlorite solution (1.03M, 25 ml) was added, followed by concentrated hydrochloric acid (2 ml) and mixed thoroughly with the polymer solution. After 2 hr the aqueous phase was separated and the polymer solution was dried over calcium chloride and filtered through a bed of magnesium sulphate. The azodicarboxylate-functional polymer was recovered by precipitation into methylated spirits and dried in vacuo at 30° C. The azodicarboxylate-functional polymer was reacted with Cariflex IR 305 poly(isoprene) in toluene (60° C., 7 days) to give graft copolymer for which no ungrafted poly($\epsilon$-caprolactone) could be detected by gel permeation chromatography, i.e. the grafting efficiency was approximately 100%.

Examples 13 to 18 illustrate the use of different oxidants for the conversion of compounds of the Formula I, where x=1, to reactive solutions of compounds of the Formula I, where x=0, and subsequent formation of azodicarboxylate-functional polymers.

EXAMPLE 13

2-Ethoxycarbonylhydrazinecarbonyl chloride (20 g, 0.12 mole) was suspended in dry dichloromethane (400 ml) at approximately 10° C. Dry pyridine (29 ml, 0.36 mole) was added, followed by a solution of bromine (6.2 ml, 0.24 mole) in dry dichloromethane (80 ml). The bromine addition lasted 15 min. The orange-red solution was transferred to a solution of hydroxyl-functional poly(styrene) ($\overline{M}_n$ 8450, d 1.06; 418 g) in toluene (1500 ml) in a dry atmosphere over a period of 1 hr. The reaction mixture was stirred at ambient temperature for 3 hr, filtered, and the polymer recovered by precipitation into methylated spirits. The dry polymer reacted with Cariflex IR 305 poly(isoprene) under the conditions described in European Patent Specification No. 0000976 to give a graft copolymer with a grafting efficiency of 73%.

EXAMPLE 14

2-Ethoxycarbonylhydrazinecarbonyl chloride (62 g, 0.037 mole) was suspended in dry dichloromethane (400 ml) at ambient temperature and oxidised with t-butyl hypochlorite (42 ml, 0.038 mole) at approximately 10° C. The hypochlorite was added over a period of 5 min. The orange-red solution was transferred to a solution of hydroxyl-functional poly(styrene) ($\overline{M}_n$ 6,550; d 1.09; 1.5 kg) in toluene (3.9 l) under a dry atmosphere, 30 min after the start of the oxidation. The polymer reaction mixture was stirred at ambient temperature overnight and washed with water before precipitation of the polymer into methylated spirits. The dry polymer reacted with Cariflex IR 305 poly(isoprene) under the conditions of European Patent Specification No. 0000976 to give a graft copolymer with a grafting efficiency of 71%.

EXAMPLE 15

2-Ethoxycarbonylhydrazinecarbonyl chloride (2.65 g, $1.59 \times 10^{-2}$ mole) was dissolved in dry dichloromethane (75 ml) and oxidised with N-chlorobenzotriazole (2.45 g, $1.60 \times 10^{-2}$ mole) at approximately 10° C. The orange-red solution was transferred to a solution of hydroxyl-functional poly(styrene) ($\overline{M}_n$ 6270; d 1.11; 48.2 g) in dichloromethane and allowed to react at ambient temperature for 2.5 hr. The polymer was recovered by precipitation into methylated spirits. The dry polymer reacted with Cariflex IR 305 poly(isoprene) under the conditions described in European Patent Specification No. 0000976 to give a graft copolymer with a grafting efficiency of 71%.

EXAMPLE 16

2-Ethoxycarbonylhydrazinecarbonyl chloride (0.5 g, $3 \times 10^{-3}$ mole) was dissolved in dry ethyl acetate (5 ml) and excess chlorine gas was passed into the flask. The solution was stirred in a chlorine atmosphere for 20 min. and a solution of hydroxyl-functional poly(styrene) ($\overline{M}_n$ 7510, d 1.25; 7.5 g) in dry toluene (25 ml) was added. The reaction mixture was stirred at ambient temperature for 1.5 hr and the polymer was recovered by precipitation into methylated spirits. The polymer was purified by two further precipitations into methylated spirits. Spectroscopic analysis of the dried polymer as a 10% w/v solution in dichloromethane showed a strong carbonyl absorption peak at 1780 cm$^{-1}$ characteristic of the azodicarboxylate function and an absorption maximum at 408 nm corresponding to an azodicarboxylate functionality of 42%.

EXAMPLE 17

2-Ethoxycarbonylhydrazinecarbonyl chloride (10.5 g, $3 \times 10^{-3}$ mole) was dissolved in dry ethyl acetate (5 ml). Pyridine (0.25 ml, $3.1 \times 10^{-3}$ mole) was added followed by excess chlorine gas. The solution was stirred for 15 min. and reacted with a solution of hydroxylfunctional poly(styrene) ($\overline{M}_n$ 7510, d 1.25; 7.5 g) as described in Example 16. The purified polymer had a strong characteristic azodicarboxylate carbonyl absorption at 1780 cm$^{-1}$ and an absorption maximum at 408 nm corresponding to an azodicarboxylate functionality of 66%.

EXAMPLE 18

2-Ethoxycarbonylhydrazinecarbonyl chloride (0.2 g, $1.2 \times 10^{-3}$ mole) was dissolved in dry ethyl acetate (5 ml). N-Bromosuccinimide (0.4 g, $2.2 \times 10^{-3}$ mole) was added and the solution stirred for 20 min. The solution was reacted with hydroxyl-functional poly(styrene) ($\overline{M}_n$ 7510, d 1.25; 1.5 g) as described in Example 16. The purified polymer had a strong characteristic azodicarboxylate carbonyl absorption at 1780 cm$^{-1}$ and an absorption maximum at 408 nm corresponding to an azodicarboxylate functionality of 67%.

Examples 19 to 24 illustrate the use of the compounds prepared in Examples 2 to 7 in oxidation to compounds of the Formula I, where x×0, and subsequent formation of azodicarboxylate-functional polymer.

EXAMPLE 19

2-Methoxycarbonylhydrazinecarbonyl chloride (2.5 g, $1.6 \times 10^{-2}$ mole) in dry dichloromethane (60 ml) was oxidised with t-butyl hypochlorite (1.8 ml, $1.59 \times 10^{-2}$ mole) at approximately 10° C. for 30 min. The orange solution was transferred to a solution of hydroxyl-functional poly(styrene) ($\overline{M}_n$ 6270, d 1.09; 50 g) in dry dichloromethane (140 ml) and reacted at ambient temperature for 3 hr. The polymer was recovered by precipitation into methylated spirits. The dry polymer reacted with Cariflex IR 305 poly(isoprene) under the conditions described in European Patent Specification No. 0000976 to give a graft copolymer with grafting efficiency of 60%.

Example 20

Example 19 was repeated but substituting 2-(2-methylpropyloxycarbonyl)hydrazinecarbonyl chloride for the 2-methoxy compound used in Example 19. The azo functional poly(styrene) gave a grafting efficiency of 75% with Cariflex IR 305 poly(isoprene) under the conditions described in European Patent Specification No. 0000976.

Example 21

Example 19 was repeated but using 2-n-hexyloxycarbonylhydrazinecarbonyl chloride and toluene as solvent. The azodicarboxylate-functional poly(styrene) gave a grafting efficiency of 62% with Cariflex IR 305 poly(isoprene) under the conditions described in European Patent Specification No. 0000976.

EXAMPLE 22

Example 19 was repeated but using 2-dodecyloxyloxycarbonylhydrazinecarbonyl chloride. The azodicarboxylatefunctional poly(styrene) gave a grafting efficiency of 88% with Cariflex IR 305 poly(isoprene) under the conditions described in European Patent Specification No. 0000976.

EXAMPLE 23

Example 19 was repeated but using 2-phenoxycarbonylhydrazinecarbonyl chloride. The azodicarboxylate-functional poly(styrene) gave a grafting efficiency of 39% with Cariflex IR 305 poly (isoprene) under the conditions described in European Patent Specification No. 0000976.

EXAMPLE 24

Example 19 was repeated but using 2-benzyloxycarbonylhydrazinecarbonyl chloride. The azodicarboxylate-functional poly(styrene) gave a grafting efficiency of 78% with Cariflex IR 305 poly(isoprene) under the conditions described in European Patent Specification No. 0000976.

Examples 25 to 32 illustrate the use of compounds of the Formula I, where x=0, for reaction with hydroxyl-functional polymers of various types to give azodicarboxylate-functional polymers which can be used to form graft copolymers by the method described in European Patent Specificaion No. 0000976, or by reaction with suitable backbone polymers in solution.

EXAMPLE 25

Hydroxyl-functional poly(methyl methacrylate) was prepared by free radical polymerization of methyl methacrylate in the presence of 2-mercaptoethanol as chain transfer agent. The initiator was azo bis-isobutyronitrile. The hydroxyl-functional poly(methyl methacrylate) ($\overline{M}_n$ 6400, d 1.47, 200 g) in toluene (1.5 l) was dried by azeotropic distillation of solvent and reacted at ambient temperature with a solution of 2-ethoxycarbonylazocarbonyl chloride in dichloromethane prepared by oxidising 2-ethoxycarbonylhydrazinecarbonyl chloride (20 g, 0.120 moles) with bromine (18.7 g, 0.117 mole) in the presence of pyridine (24.6 g, 0.310 mole). The reaction time was 2 hr. The polymer was recovered by precipitation into a mixture of methanol (1 part) and petroleum either (4 parts; bp 40°–60° C.). The azodicarboxylate-functional polymer reacted with Cariflex IR 305 poly(isoprene) under the conditions described in European Patent Specification No. 0000976, using an initial mixing cavity temperature of 130° C. The grafting efficiency was 65%.

EXAMPLE 26

Example 25 was repeated but using poly(n-butyl methacrylate) ($\overline{M}_n$ 14300, d 1.4) prepared by free radical polymerization in the presence of 2-mercaptoethanol as chain transfer agent. The azodicarboxylate-functional poly(n-butyl methacrylate) was reacted with Cariflex IR 305 poly(isoprene) in toluene solution (24 hr, 100° C.) to give a graft copolymer with a grafting efficiency of 59%.

EXAMPLE 27

Example 25 was repeated but using poly(lauryl methacrylate) ($\overline{M}_n$ 9400, d 1.9) prepared by free radical polymerization in the presence of 2-mercaptoethanol as chain transfer agent. The azodicarboxylate-functional poly(lauryl methacrylate) was reacted with Cariflex IR 305 poly(isoprene) in toluene solution (24 hr, 100° C.) to give a graft copolymer with a grafting efficiency of 70%.

EXAMPLE 28

Example 25 was repeated but using poly(styrene) ($\overline{M}_n$ 6600, d 1.97) prepared by free radical polymerization in the presence of 1,1,1-tribromoethanol as chain transfer agent. The azodicarboxylate-functional polymer was reacted with Cariflex IR 305 poly(isoprene) under the conditions described in European Patent Specification No. 0000976 giving a grafting efficiency of 62%.

EXAMPLE 29

Hydroxyl-functional poly(α-methyl styrene) was prepared by anionic polymerization of α-methylstyrene in tetrahydrofuran at −78° C. using n-butyl lithium as initiator and reaction of the polymer carbanion with ethylene oxide followed by acid. The hydroxyl-functional poly(α-methyl styrene) ($\overline{M}_n$ 3500, 45 g) was reacted in toluene solution with a solution of 2-ethoxycarbonylazocarbonyl chloride, prepared by oxidising 2-ethoxycarbonylhydrazinecarbonyl chloride (4.24 g, $2.6 \times 10^{-2}$ mole) with t-butyl hypochlorite (2.87 g, $2.6 \times 10^{-2}$ mole) in dry dichloromethane (30 ml). The reaction time with polymer was 1 hr at ambient temperature. The polymer was recovered by precipitation into methylated spirits. The azodicarboxylate-functional poly(α-methylstyrene) gave a graft copolymer with 72% grafting efficiency when reacted with Cariflex IR 305 poly(isoprene) under the conditions described in European Patent Specification No. 0000976 using an initial mixing cavity temperature of 130° C.

EXAMPLE 30

Hydroxy-functional poly(ε-caprolactone) was prepared as described in Example 12. The polymer was isolated in the hydroxyl form by washing the polymerization solution with 2N hydrochloric acid and precipitating the polymer into petroleum spirit (bp 60°–80° C.). The dry polymer ($\overline{M}_n$ 11300, 195.5 g) was dissolved in dichloromethane (700 ml) and reacted with a solution of 2-ethoxycarbonylazocarbonyl chloride, prepared by oxidation of 2-ethoxycarbonylhydrazinecarbonyl chloride (4.95 g, $2.97 \times 10^{-2}$ mole) with t-butyl hypochlorite (3.7 g, $3.27 \times 10^{-2}$ mole) in dichloromethane (100 ml). After 1 hr at ambient temperature the polymer was recovered by precipitation into methylated spirits. The polymer in dichlormethane solution showed an absorption maximum at 408 nm characteristic of the azodicarboxylate function and corresponding to an azodicarboxylate functionality of 42%.

EXAMPLE 31

Hydroxyl-functional poly(dimethylsiloxane) was prepared by the method of Lefebure, Jerome and Teyssie (Macromolecules 10, 1977, p. 811), using 6-lithiohexyl acetaldehyde acetal as initiator followed by hydrolysis of the acetal function on the polymer. The hydroxyl-functional poly(dimethylsiloxane) ($\overline{M}_n$ 10,000, 16 g) was reacted in dichloromethane solution with a solution of 2-ethoxycarbonylazocarbonyl chloride, prepared by oxidising 2-ethoxycarbonylhydrazinecarbonyl chloride (3.65 g, $2.2 \times 10^{-2}$ mole) with t-butyl hypochlorite (2.39 g, 0.022 mole) in dry dichloromethane (75 ml). The reaction time with polymer was 16 hr at ambient temperature. The azodicarboxylate-functional poly(dimethylsiloxane) was extracted with methanol and dried to give a yellow fluid. The azocarboxylate-functional poly(dimethylsiloxane) reacted with Cariflex IR 305 poly(isoprene) in toluene solution (6 days, 60° C.) to give graft copolymer with 33% grafting efficiency.

Example 32

Hydroxyl-functional poly(ethylene oxide) ($\overline{M}_n$ 1560) is available commercially as Ethylan HA (Lankro Chemicals Ltd). The polymer (30 g) was dissolved in toluene (100 ml) and the solution was dried by azeotropic distillation of solvent. The polymer solution was cooled to ambient temperature and reacted with a solution of 2-ethoxycarbonylazocarbonyl chloride prepared by oxidation of 2-ethoxycarbonylhydrazinecarbonyl chloride (5.0 g, $3 \times 10^{-2}$ mole) with t-butyl hypochlorite (3.5 g, $3.2 \times 10^{-2}$ mole) in dry dichloromethane (20 ml). The polymer reaction time was 1 hr at ambient temperature and the polymer was recovered by evaporation of the solvent and repeated washing of the residue with petroleum spirit (bp 30°–40° C.). The azodicarboxylate-functional poly(ethylene oxide) reacted with Cariflex IR 305 poly(isoprene) in toluene solution (7 day, 60° C.) to give graft copolymer with grafting efficiency of 36%.

Example 33 demonstrates that the oxidation of compounds of the Formula I, where x=1, to compounds of the Formula I, where x=o, can be carried out in the presence of hydroxyl-functional polymer.

Example 33

2-Ethoxycarbonylhydrazinecarbonyl chloride (66 g, 0.4 mole) was dissolved in dry ethyl acetate (350 ml) and the solution was added to a solution of hydroxyl-functional poly(styrene) ($\overline{M}_n$ 7110, d 1.35, 1.5 l kg) in toluene (3.9 l). t-Butyl hypochlorite (88 ml, 0.78 mole) was added over 10 min. and the reaction allowed to proceed for 2 hr. The polymer solution was washed with water and the azodicarboxylate-functional polymer recovered by precipitation into methylated spirits. The dry polymer was reacted with Cariflex IR 305 poly(isoprene) under the conditions described in European Patent Specification No. 0000976 to give a graft copolymer with a grafting efficiency of 84%.

Examples 34 and 35 illustrate the preparation of compounds of the formula I, where Z=ArO, x=1 and 0.

EXAMPLE 34

Phenyl chloroformate (32.34 g, 0.207M) in dichloromethane (100 ml) was reacted with ethyl carbazate (20.8 g, 0.2M) in dichloromethane (150 ml) and pyridine (16.63 g, 0.21M) to give ethyl phenyl hydrazine-1,2-dicarboxylate (40.5 g). After chromatography on silica gel using dichloromethane and ethyl acetate, recrystallization from toluene gave colourless solid m.p. 89.5–90.5. (Found C 53.8%, H 5.5%, N 12.7%; $C_{10}H_{12}N_2O_4$ requires C 53.6%, H 5.4%, N 12.5%). The infra-red spectrum (0.5% in dichloromethane) showed bands at 3360 cm$^{-1}$ (NH), 1775 and 1745 cm$^{-1}$ (>C=O), and 1600 cm$^{-1}$ (aromatic ring). Oxidation of the diester (5 g) in dichloromethane (25 ml) with t-butyl hypochlorite and evaporation of the solvent gave a red oil which was extracted with petroleum spirit (b.p. 30°–40° C.) to isolate ethyl phenyl azodicarboxylate (4 g). (Found C 53.9%, H 4.6%, N 12.4%, $C_{10}H_{10}N_2O_4$ requires C 54.1%, H 4.5%, N 12.6%). The infra-red spectrum (0.4% in dichloromethane) showed bands at 1792 with a shoulder at circa 1780 cm$^{-1}$ (>C=O) and 1600 cm$^{-1}$ (aromatic ring) and no >NH band at 3360 cm$^{-1}$.

EXAMPLE 35

Example 34 was repeated but using p-chlorophenyl chloroformate. The hydrazine 1,2-dicarboxylate was obtained as colourless crystals m.p. 125.3°–126.2° C. on recrystallization from toluene. (Found C 46.7%, H 4.0, N 11.0; $C_{10}H_{11}ClN_2O_4$ requires C 46.4%, H 4.3%; N 10.8%). The infra-red spectrum (0.5% in dichloromethane) showed bands at 3390 cm$^{-1}$ (NH), 1785 and 1751 (>C=O). Oxidation of the diester (5 g) in dichloromethane (25 ml) with t-butyl hypochlorite and evaporation of the solvent gave a red oil which was extracted with petroleum spirit (b.p. 30°–40° C.) to isolate p-chlorophenyl ethyl azodicarboxylate as a red oil (4.8 g). (Found C 47.1%, H 3.3%, N 10.6%, Cl 14.1%; $C_{10}H_9ClN_2O_4$ requires C 46.8%, H 3.5%, N 10.9%, Cl 13.8%). The infra-red spectrum (0.5% in dichloromethane) showed a band at 1799 with a shoulder at circa 1786 cm$^{-1}$ (>C=O).

Examples 36 to 38 illustrate the use of compounds of the formula I, where Z=ArO—, x=0, in the preparation of polymers with azodicarboxylate functionality.

EXAMPLE 36

Hydroxyl-functional poly(styrene) ($\overline{M}_n$ 7510, d 1.25, 19.8 g, 2.64×10$^{-3}$ mole) and imidazole (0.018 g, 2.64×10$^{-4}$ mole) were dissolved in dry dichloromethane (40 ml) and reacted with ethyl phenyl azodicarboxylate (3.5 g, 15.8×10$^{-3}$ mole) at room temperature for one day. The recovered azodicarboxylate-functional poly(styrene) gave a grafting efficiency of 74% with Cariflex IR 305 poly(isoprene) under the conditions described in European Patent Specification No. 0000976.

EXAMPLE 37

Hydroxyl-functional poly(styrene) ($\overline{M}_n$ 7510, d 1.25, 19.95 g, 2.66×10$^{-3}$ mole) and imidazole (0.018 g, 2.64×10$^{-4}$ mole) were dissolved in dichloromethane (50 ml) and reacted with p-chlorophenyl ethyl azodicarboxylate (1.363 g, 5.31×10$^{-3}$ mole) at room temperature for one day. The recovered azodicarboxylate-functional poly(styrene) gave a grafting efficiency of 57% with Cariflex IR 305 poly(isoprene) under the conditions described in European Patent Specification No. 0000976.

EXAMPLE 38

Hydroxyl-functional poly(styrene) ($\overline{M}_n$ 7510, d 1.25, 20.1 g, 2.68×10$^{-3}$ mole) and p-chlorophenyl ethyl azodicarboxylate (1.37 g, 5.34×10$^{-3}$ mole) were dissolved in dichloromethane (50 ml) and allowed to react at room temperature. Samples of polymer isolated at intervals and analysed by ultra-violet spectroscopy (407 nm) had azodicarboxylate functionalities of 19% (3 days), 43% (7 days), 63% (17 days), 75% (24 days) and 80% (30 days).

We claim:

1. A method of preparing an azodicarboxylate-functional polymer by mixing a hydroxyl-functional polymer with a compound having the formula:

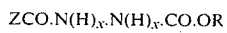

where ZCO— is a carboxylic acid derivative reactive towards hydroxyl groups, wherein 2 is halogen or aryloxy x is 0 or 1, and R is a $C_1$ to $C_{12}$ primary or secondary straight- or branched-chain alkyl, cycloalkyl, aralkyl, aryl or alkaryl group;

in an anhydrous organic reaction medium which is a solvent for the reactants; maintaining the mixture under conditions to effect reaction between the polymer and the compound; when x is 1, oxidizing the hydrazo group of the product to an azo group; and recovering the resulting azodicarboxylate-functional polymer.

2. A method as claimed in claim 1, wherein the group ZCO is a carbonyl chloride group.

3. A method as claimed in claim 1, wherein Z is aryloxy.

4. A method as claimed in claim 1, wherein the hydroxy-functional polymer is represented as having the formula QOM, where Q is an inert polymeric group and M is either hydrogen or a negative charge, associated with a positive metal counter-ion, such that the polymer exhibits hydroxyl functionality, and the reaction between the polymer and the compound is represented as

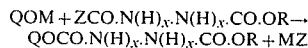

5. A method as claimed in claim 1, wherein x is 1 and the chemical reaction is catalysed by pyridine or quinoline.

6. A method as claimed in claim 1, wherein the hydroxyl-functional polymer has the formula QOH, where Q is an inert polymeric group.

7. A method as claimed in claim 1, wherein the hydroxyl-functional polymer has the formula QOM, where Q is an inert polymeric group and M is a negative charge associated with an aluminium counter-ion.

8. A method as claimed in claim 3, wherein x is 0 and the chemical reaction is catalysed by imidazole or triphenylphosphine.

* * * * *